A. ALLMON.
FURROW FILLER.
APPLICATION FILED NOV. 13, 1915.
1,186,365.
Patented June 6, 1916.
2 SHEETS—SHEET 2.
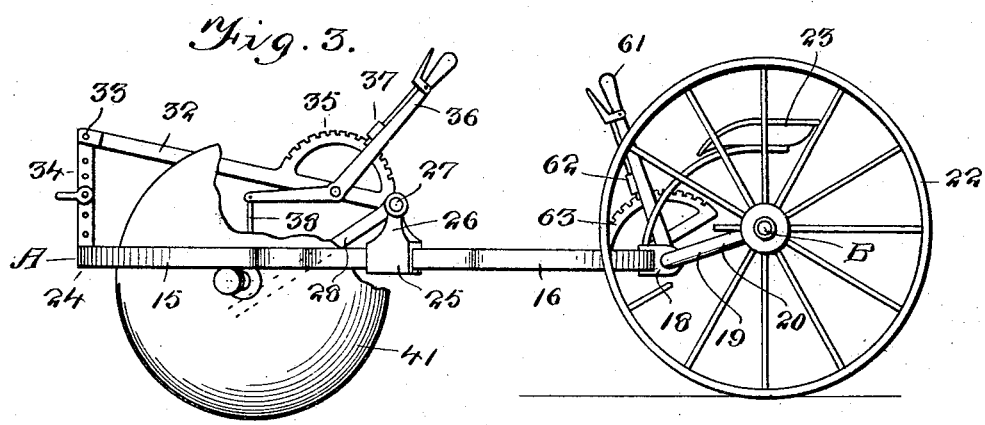
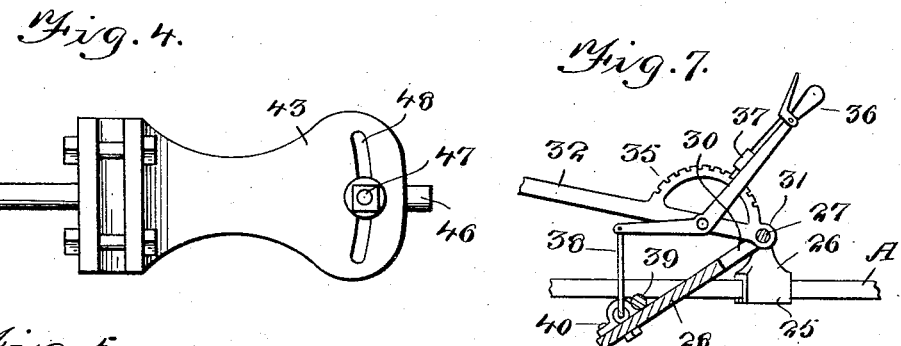
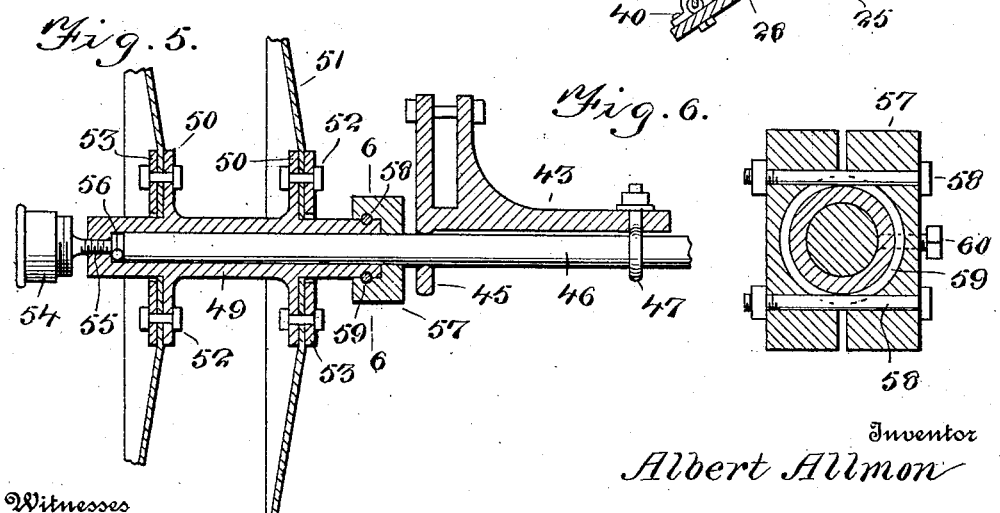
Inventor
Albert Allmon
Witnesses
By Victor J. Evans
Attorney

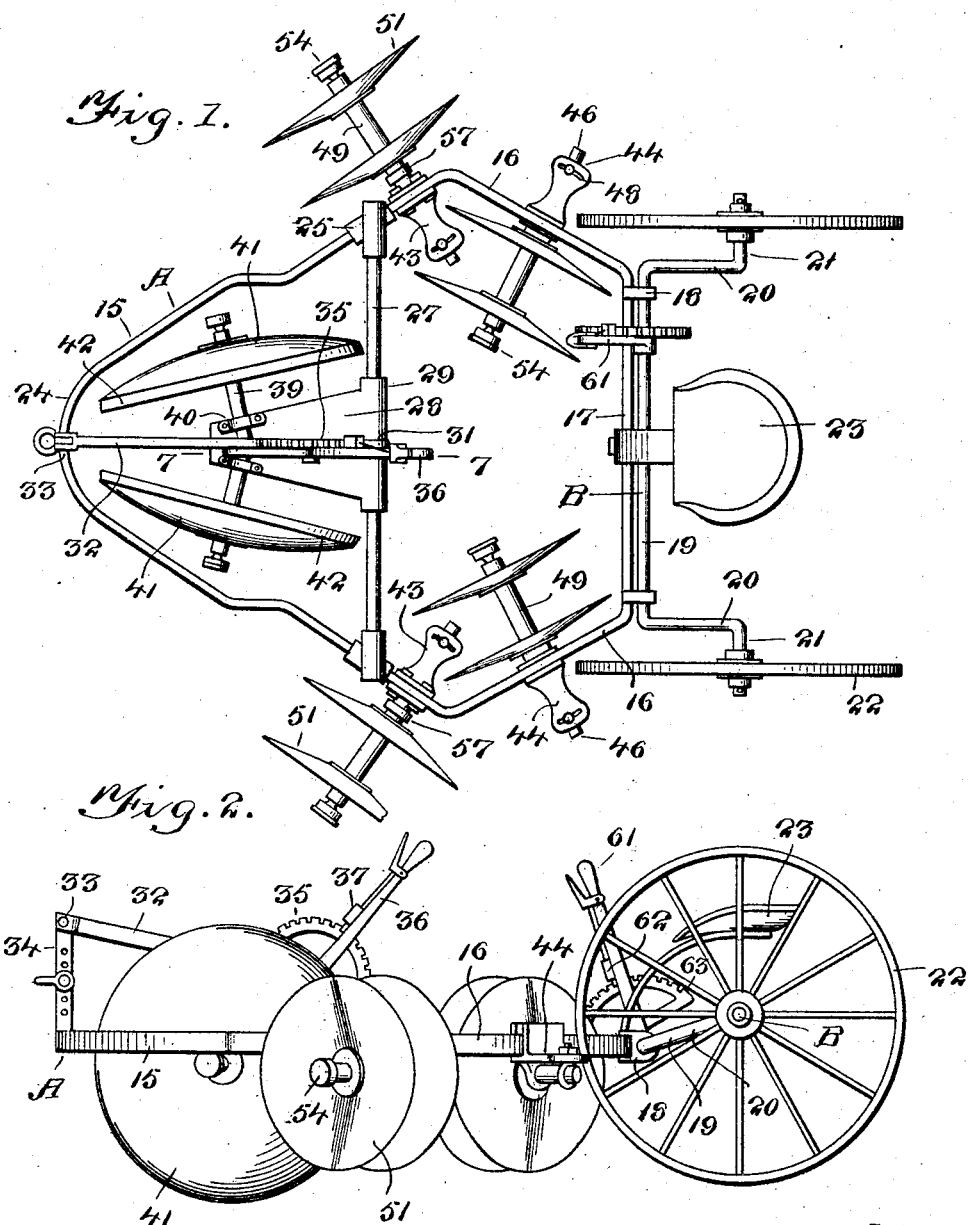

UNITED STATES PATENT OFFICE.

ALBERT ALLMON, OF STAFFORD, KANSAS.

FURROW-FILLER.

1,186,365.  Specification of Letters Patent.  Patented June 6, 1916.

Application filed November 13, 1915. Serial No. 61,313.

*To all whom it may concern:*

Be it known that I, ALBERT ALLMON, a citizen of the United States, residing at Stafford, in the county of Stafford and State of Kansas, have invented new and useful Improvements in Furrow-Fillers, of which the following is a specification.

This invention relates to plows of the disk type utilized for filling listed furrows to prepare the land for subsequent crops of small grain, such as wheat, oats and the like, the device of the present invention being properly designated as a furrow filler.

The invention has for its object to produce a simple and effective device embodying a suitable carrying frame, dished wheels that are guided in one furrow to be filled, and plow disks whereby the dirt is moved from the ridges or high places into the adjacent furrows.

A further object of the invention is to simplify and improve the mounting of the plow disks and to provide for the angular as well as the horizontal and vertical adjustment thereof.

A further object of the invention is to simpify and improve the construction of the carrying frame.

With these and other ends in view which will readily appear as the nature of the invention is better understood, the same consists in the improved construction and novel arrangement and combination of parts which will be hereinafter fully described and particularly pointed out in the claims.

In the accompanying drawings has been illustrated a simple and preferred form of the invention, it being, however, understood that no limitation is necessarily made to the precise structural details therein exhibited, but that changes, alterations and modifications within the scope of the claims may be resorted to when desired.

In the drawings,—Figure 1 is a top plan view of a machine constructed in accordance with the invention. Fig. 2 is a side elevation of the same. Fig. 3 is a side elevation, showing the frame, the supporting wheels and the guide wheels, the plow disks having been detached. Fig. 4 is a detail plan view of one of the supports for the plow disks detached from the frame. Fig. 5 is a sectional detail view taken on the line 5—5 in Fig. 1. Fig. 6 is a sectional detail view taken on the line 6—6 in Fig. 5. Fig. 7 is a sectional detail view taken on the line 7—7 in Fig. 1.

Corresponding parts in the several figures are denoted by like characters of reference.

The main frame A of the improved machine may be constructed from a single bar of iron or steel by properly bending and otherwise manipulating said bar which should be of rectangular cross section and of proper dimensions to insure the desired strength and rigidity. The frame includes forwardly convergent side members 15 and rearwardly convergent side portions 16, the latter being connected together at their rearward ends by a cross bar 17 having boxings 18 receiving the arch portion 19 of the axle B, said axle having limbs 20 equipped with spindles 21 on which the supporting wheels 22 are mounted for rotation. The axle also supports a seat 23 for the driver or operator. The forward ends of the forwardly converging frame member 15 are connected together by a short bridge piece 24.

Secured on the frame members 15 near their rearward ends are clamps 25 having upwardly extending brackets 26 supporting a cross bar or shaft 27 of circular cross section on which, about midway between the ends thereof, is swingingly mounted a block or casting 28 having a sleeve 29 that engages the shaft 27, said sleeve having a notch 30 to accommodate an eye 31 formed at one end of a brace rod 32, said eye engaging the shaft 27, and said brace rod being connected at its forward end, as seen at 33, with a hitching bar 34 rising from the bridge portion 24 at the forward end of the frame. The brace 32 supports a rack segment 35 and a lever 36 having a stop member 37 engaging said rack segment, said lever being connected by a link 38 with the swingingly supported block 28, which latter may thus be adjusted about the axis of the shaft 27. The block 28 supports a bent axle 39, said axle being secured by means of a boxing 40 bolted on the block 28. The axle supports the forwardly convergent guide wheels 41, said guide wheels consisting of disks having outwardly disposed convex faces, said disks being provided with circumferential flanges 42, constituting rims or tires, at the edges thereof. Said disks will, therefore, not cut into the ground to excavate the dirt, and they will constitute guide wheels adapted to run in the furrow that is to be filled by the plow disks carried by the machine, as will be presently described.

Clamped on the forwardly convergent side portions 15 of the main frame near the rearward ends of said side portions, are supporting members 43, said supporting members extending inwardly with respect to the frame members. Supporting members 44, similar to the supporting members 43, are clamped on the rearwardly convergent side portions 16 of the main frame, said supporting members 44 extending outwardly with respect to the frame portions on which they are clamped. The supporting members 43 and 44 serve for the support of the shafts or axles on which the plow disks are mounted, and the construction of the supporting members and related parts is illustrated in Fig. 5, by reference to which it will be seen that each supporting member has a downwardly extending eye 45 supporting a shaft or axle 46, one end of which extends through an eye bolt 47 adjustably engaging an arcuate slot 48 in the supporting member, thus enabling the shaft or axle to be adjusted in an approximately horizontal plane, it being understood that the eye 45 is properly tapered to enable the requisite adjustment to be effected. Each shaft or axle 46 supports the boxing 49 having flanges 50 on which the plow disks 51 are secured by means of bolts 52 and collars or washers 53. The outer end of the boxing 49 is closed and has an oil cup 54 connected therewith by a threaded shank 55 between which closed outer end of the boxing 49 and the outer extremity of the axle 46 is interposed an anti-friction ball 56. For the purpose of mounting the boxing 49 on the axle 46 there is employed a two-part collar 57, the parts of which are connected together by means of bolts 58, said bolts engaging an annular groove or recess 59 in the boxing, which latter is thus connected with the collar 57 against endwise movement, but in such a manner as to permit the boxing to rotate freely about the axle. The collar 57 may be securely clamped on the axle 46 by means of a set screw 60, whereby the collar, being firmly retained, will serve to retain the boxing and the disks carried thereby against endwise displacement.

While plow disks of any well known construction may be used, it is intended to use disks constructed substantially as seen in Fig. 5, by reference to which it will be seen that said disks instead of being of arcuate cross section are true conic sections, this form of disks being found very effective for cutting into the soil and moving the dirt.

For the purpose of effecting adjustment between the main frame A and the axle B, a lever 61 is employed, said lever having a stop member 62 engaging a rack segment 63. It will be seen that by tilting the frame the forward portion of which is supported on the guide wheels 41, the rearward part of the frame carrying the plow disks may be raised and lowered, thereby regulating the depth to which the plow disks shall be permitted to operate. Angular adjustment of the plow disks may be effected by proper adjustment of the eye bolts 47 in the arcuate slots 48 of the supporting members.

From the foregoing description, taken in connection with the drawings hereto annexed, the operation and advantages of this invention will be readily understood.

The machine herein illustrated is adapted to fill a central or intermediate furrow with material taken from two adjacent ridges and at the same time to partly fill two adjacent furrows with material taken from the said two ridges. The guide wheels are made to travel in the central furrow that is to be filled, the disks constituting the guide wheels engaging the sloping side walls of the furrows, and the circumferential rims of said disks serving to prevent the disks from cutting and sinking into the ground. The forward plow disks which are supported adjacent to the two outside faces of the frame members will move a portion of the dirt from the ridges or high portions in an outward direction into the two outside furrows adjacent to said ridges; the remaining dirt of said ridges will be subsequently engaged by the rearward plow disks which are supported adjacent to the inner face of the frame members and will be moved by said disks into the central furrow, filling the latter and leaving the soil in a level condition for subsequent cultivation. On the return trip of the machine one of the partly filled furrows will be filled, as will be readily understood, and it will thus be seen that by each passage after the first one two furrows will be filled by the machine. By removing the forward plow disks, and properly adjusting the rearward plow disks the machine may be utilized for filling a single furrow at each passage.

By the improved machine construction as herein described, the work of filling listed furrows may be quickly and effectively performed, the surface of the soil being restored to a level condition, whereby the subsequent cultivation of small crops will be greatly facilitated, thereby promoting the equal distribution of precipitated moisture and avoiding the accumulation of water in some parts of the soil to the exclusion of other portions.

The improved machine is simple in construction, easily manipulated and thoroughly effective for the purposes for which it is provided.

Having thus described the invention, what is claimed as new, is:—

1. A wheel carrying axle, a main frame hingedly connected therewith and having a transverse shaft, a block swingingly supported on the shaft, and forwardly convergent furrow engaging guide disks carried by the block.

2. A wheel carrying axle, a main frame hingedly connected therewith and having a transverse shaft, a block swingingly supported on the shaft, forwardly convergent furrow engaging guide disks carried by the block, means for effecting adjustment of the swinging block about the axis of the shaft, and means for retaining the block and the guide disks carried thereby at various adjustments.

3. In a machine of the class described, a wheel carrying arched axle, a main frame hingedly connected therewith, means for effecting angular adjustment between the axle and the frame, a transverse shaft carried by the frame, a block swingingly supported thereon, a box member bolted on the block, a bent axle clamped between the block and the box member, and forwardly convergent guide disks journaled on the bent axle.

4. In a machine of the class described, a wheel carrying axle, a main frame hingedly connected therewith, a transverse shaft mounted on the main frame, a block having a sleeve pivotally engaging the shaft, said sleeve being provided with a notch intermediate the ends thereof, a hitching bar rising from the front end of the main frame, a brace connecting said hitching bar with the transverse shaft, said brace having an eye accommodated in the notch of the sleeve, a lever fulcrumed on the brace bar to effect adjustment of the block, a bent axle secured on the block, and guide disks mounted on said axle.

5. In a machine of the class described, a wheel carrying axle, a main frame hingedly connected therewith, forwardly convergent furrow engaging guide disks carried by the main frame, means for effecting vertical adjustment of the guide disks relatively to the main frame, and sets of plow disks carried by the main frame to the rearward of the furrow engaging guide disks, whereby, by adjustment of the latter, the plow disks may be raised and lowered relatively to the ground.

6. In a machine of the class described, a wheel carrying axle, a main frame hingedly connected therewith, said main frame having forwardly convergent front side portions and rearwardly convergent rear side portions, a transverse shaft supported on the front side portions, a bridge piece connecting the forward ends of said front side portions, a hitching bar rising from the bridge piece, a brace connecting the hitching bar with the transverse shaft, a block swingingly connected with the shaft, forwardly convergent guide disks carried by the block, supporting members clamped on the forwardly convergent front portions and on the rearwardly convergent side portions of the frame, axles carried by the supporting members, means for effecting adjustment of the axles in an approximate horizontal plane, and plow disks mounted for rotation on the axles.

7. A wheel carrying axle, a main frame hingedly connected therewith and having a transverse shaft, a block swingingly supported on said shaft, means for securing the block at various adjustments, and ground engaging guide disks carried by the block, said disks having convex outer faces and flat circumferential rim flanges.

In testimony whereof I affix my signature in presence of two witnesses.

ALBERT ALLMON.

Witnesses:
W. F. SANDIFER,
E. B. WEIR.

Copies of this patent may be obtained for five cents each, by addressing the "Commissioner of Patents, Washington, D. C."